United States Patent [19]
Kerr

[11] 3,899,791
[45] Aug. 12, 1975

[54] PHOTOGRAPHIC POSITIONING AND ALIGNING GRID
[75] Inventor: Maximilian Kerr, Sea Girt, N.J.
[73] Assignee: Maximilian Kerr Associates, Inc., New York, N.Y.
[22] Filed: Feb. 9, 1973
[21] Appl. No.: 331,314

[52] U.S. Cl. .............................. 354/155; 354/224
[51] Int. Cl. ........................................ G03b 19/12
[58] Field of Search ............ 95/44, 45, 49, 36, 37; 355/44; 354/152, 155, 224

[56] References Cited
UNITED STATES PATENTS

| | | | |
|---|---|---|---|
| 1,991,924 | 2/1935 | Dolan | 95/36 |
| 2,388,240 | 11/1945 | Appling | 355/44 |
| 3,240,116 | 3/1966 | Stamm | 355/44 |
| 3,641,900 | 2/1972 | Ataka et al. | 95/36 |

Primary Examiner—John M. Horan
Attorney, Agent, or Firm—Bierman & Bierman

[57] ABSTRACT

An improved photographic camera of the type having a viewfinder wherein the improvement comprises a means for precisely aligning and placing the subject to be photographed within the field of exposure of the camera.

13 Claims, 2 Drawing Figures

PHOTOGRAPHIC POSITIONING AND ALIGNING GRID

The drawings in this document contain material to which a claim to copyright is made. The copyright owner, assignee herein, hereby gives permission to the public to copy said material in connection with the making of copies of this document. The permission hereby given is conditioned on the retention of the entire copyright notice on each copy made. The Patent Office has not examined the claim to copyright in any way and has taken no position with respect to validity thereof.

This invention relates to photographic equipment and in particular to an improved camera in which the subject to be photographed can be precisely positioned anywhere within the field of exposure for single or multiple exposures as required, and more particular for commercial applications of the above.

Difficulties are often encountered by professional and amateur photographers in properly placing the subject being photographed within the film exposure field. These difficulties stem from the fact that the image seen through the viewfinder of a camera is not precisely the same as that which is exposed. In addition, the picture may, at some later time, be masked or cropped or converted from one viewing medium, such as slides to another, such as a film strip or television. During such conversion important portions of the picture may be lost. Further, often messages of one kind or another, such as logo types or slogans, must be added to the picture. Unless room is left for such messages, important parts of the picture may be cut out or hidden.

In order to overcome these difficulties, the present invention was devised for use with commercially available photographic equipment. Although the invention can be used with any camera, those of the single lens reflex variety particularly lend themselves for use in conjunction with the present invention. In view of this, the invention will be described with respect to a camera of the single lens reflex type.

In accordance with the present invention, means for aligning and centering the subject to be photographed within the field of exposure is provided. The aligning and centering means is inserted into a standard camera by mounting a prefabricated grid having a variety of markings on it into the viewfinding optical path. The grid has markings which enable the subject to be positioned accurately for a variety of applications.

The photographer chooses the particular grid markings which suit his intended purpose and aligns and positions the subject according to the markings. The film is then exposed. After development the subject photographed will be of the correct size and in the correct position for further processing, such as conversion to a different medium for viewing. In this way, important parts of the photograph will not be lost or hidden by subsequent masking or viewing through a medium, such as television, where the shape of the screen may not be rectangular.

This invention is particularly well suited for use in commercial and advertising presentation where placement of subject and messages may be critical to effectiveness. It is, however, also applicable to pleasure and noncommercial uses as a guide to better composition and alignment of subjects.

The accompanying drawings illustrate a preferred embodiment of the present invention wherein like numerals refer to like parts and wherein.

Figure 1:
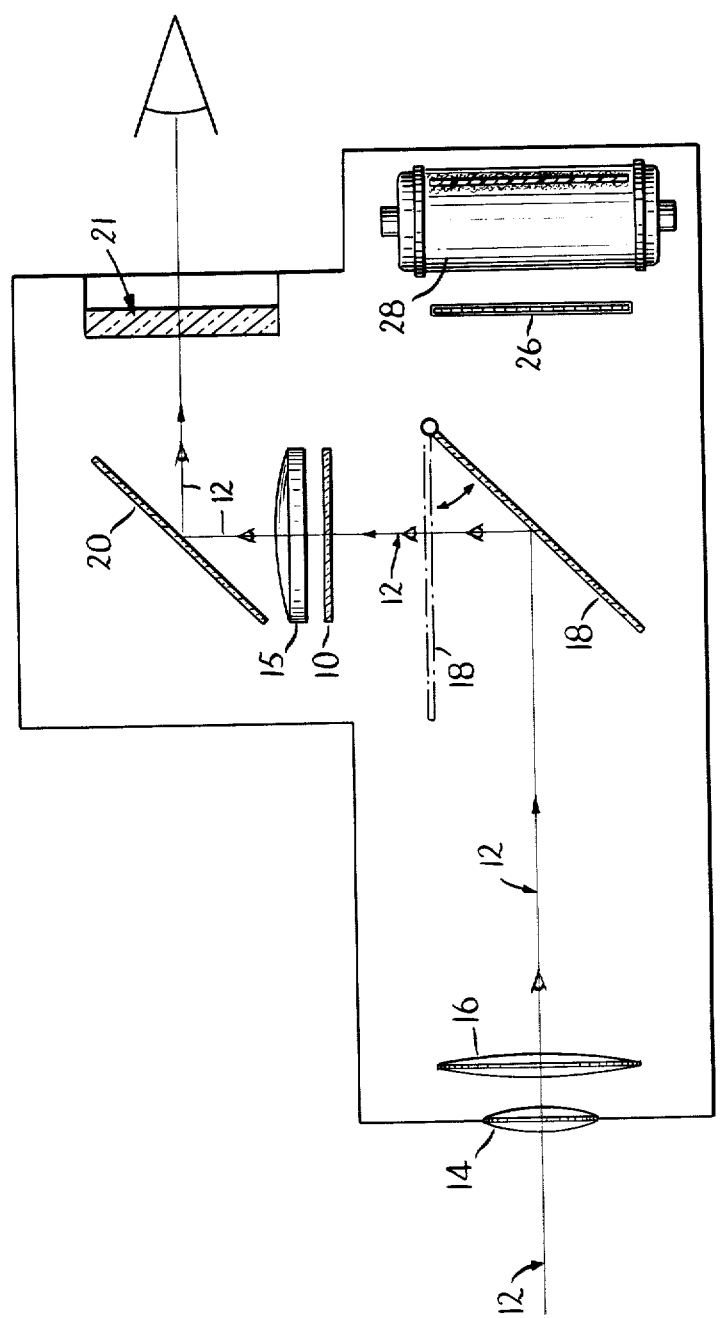
FIG. 1 is an exploded view of a single lens reflex camera modified to include the present invention.

As seen in FIG. 1, the grid 10 of the present invention is placed in the optical path 12 of the focusing screen and viewfinding system of the camera. This optical path originates with light reflected off the subject to be photographed. It then passes through the camera aperture 14 and lens 16 to quickreturn mirror 18. Mirror 18 reflects the light through grid 10 and through focusing viewfinder 15 to stationary mirror 20 which in turn reflects the image through the camera viewfinder eyepiece 21. Focusing viewfinder as that term is used herein includes ground glasses, pentaprism etc. and any method of photographic focusing useful in conventional cameras.

The camera is modified to include the grid by inserting the grid in front of the focusing viewfinder 15. The position of the grid is then precisely calibrated to the focal plane of the individual camera and the grid is permanently affixed to the focusing viewfinder 15. Such calibration must be precise and often takes a trained technician several hours to accomplish.

In use, the photographer chooses the appropriate markings on the grid to guide him to place the subject on the grid in accordance with the intended purposes of the photograph. The shutter release button is then pushed, moving the quick return mirror 18 out of the optical path and opening the shutter 26 to expose film 28. If the photographer has utilized the grid correctly, the film will be exposed such that the subject or subjects are positioned precisely as intended on the film.

Figure 2:
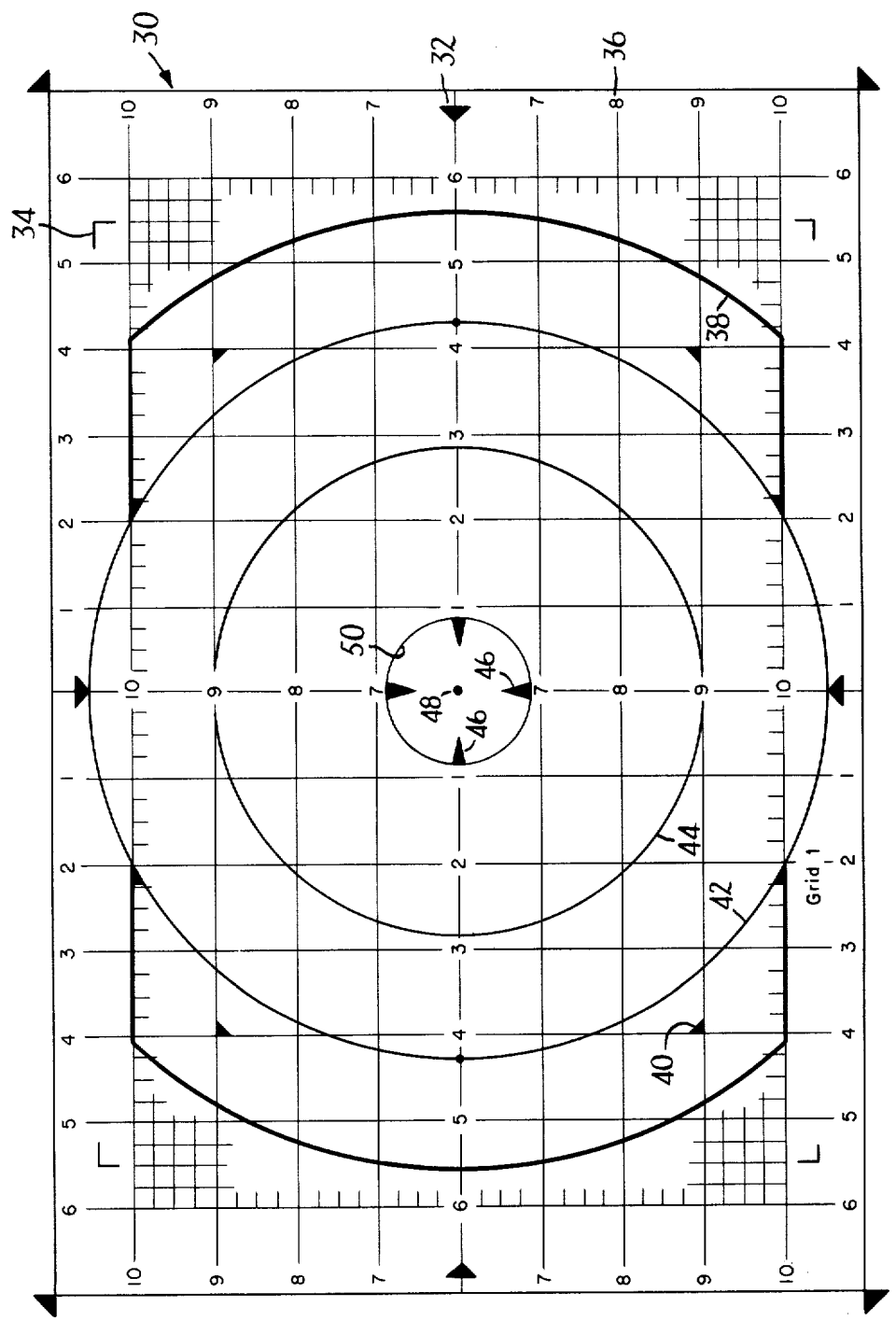
FIG. 2 is a plan view of the grid of the present invention.

The grid is illustrated in FIG. 2. Although the grid markings shown are not the only markings which can be used, the preferred embodiment is shown as having markings representative of the types which are most generally useful.

Numeral 30 refers to a rectangular outline indicating the outer perimeter projection area of a standard 35 mm proportion transparency after the transparency has been conventionally mounted or masked. A transparency which has been masked or mounted tends to have a portion of the picture area covered by the mounting or masking material. By making the grid perimeter correspond to the mask or mount inner perimeter, the photographer will be aware of exactly what area of the photographed subject will be seen on the finished mounted photograph.

Arrows 32, near the outer perimeter 30, act as guides for centering the subject as well as for horizontal and vertical positioning. The arrows 32 enable the photographer to determine the correct angular placement of the subject with respect to an imaginary horizontal or vertical axis within the visible area of the photograph.

The grid also contains a pair of perpendicular lines 34 near each corner. These perpendicular lines 34 serve as a guide to the live area of a standard filmstrip. They are also useful as a cropping guide when converting 35 mm double frame slides to a single frame filmstrip. Therefore, if the photograph will be used for both 35 mm and filmstrip reproduction, the subject must be within lines 34 as well as outline 30.

The grid is provided with numerals 36 along the interior of the outline 30. The numerals 36 are used to facilitate precise centering of the subject material and as reference numbers to specific grid squares in multiple exposure applications.

Curved lines 38 serve as a television pictorial live area guide within a standard 35 mm frame. This is used when shooting slides for television to insure that the subject will be fully visible during broadcasting.

Four wedges 40 are provided to mark a rectangular area indicating the acceptable field for a television word message, such as typeset matter, lettering, logotypes or slogans. Photographing these messages within this area will insure that the entire message will be visible during a television broadcast. This is particularly applicable for shooting commercials of various types.

Circle 42 is a large circle mask guide for use when photographing a subject within a circle. It is also useful to speed optical centering and alignment of any photographic subject on the grid.

Circle 44 is a medium circle mask guide. This circle is also useful for centering and alignment.

Four arrowhead markings 46 are provided around the exact center dot 48 for centering. The markings 46 and dot 48 are within a clear circular area 50 to facilitate focusing of the subject on the camera's viewfinder.

The grid itself is divided into four quadrants each of which consists of 24 small squares. Each of these squares (except for the peripheral ones) is further subdivided into 16 squares. These squares are used as a guide for the precise placement of multiple images of same focus or mixed size originals on a single frame of film when making multiple exposures.

It will be understood that I intend to cover all changes and modifications of the preferred form of my invention herein chosen for purposes of illustration which do not constitute departures from the spirit and scope of my invention.

What is claimed is:

1. In a single lens reflex camera having a focal plane, a pivotable mirror for selectively and and alternately directing light to the camera film and to the said viewfinder focal plane, the improvement comprising means mounted on said viewfinder focal plane, said means having a plurality of markings thereon for dividing said viewfinder focal plane into one or more viewable areas, said viewfinder focal plane being mounted intermediate of the said eyepiece and a camera lens, said means and the film plane being substantially equidistant from said pivotable mirror, said means being precisely sized to a selected exposable area of the film in said camera, said plurality of markings precisely correlating the location of a subject in said viewfinder to the selected exposable area of the film whereby the precise location of the image on the film is controlled.

2. The camera specified in claim 1 wherein the exposable area delineated by said markings corresponds to the viewable film area after said film has been mounted in a slide.

3. The camera specified in claim 1 wherein the markings comprise a lined grid pattern for forming a plurality of exposable areas.

4. The camera specified in claim 3 wherein the lines in said grid pattern are numbered.

5. The camera specified in claim 1 wherein said markings comprise a television live area guide.

6. The camera specified in claim 1 wherein said markings comprise a film strip live area guide.

7. The camera specified in claim 1 wherein said markings comprise a television word message guide.

8. The camera specified in claim 1 wherein said markings comprise a mask guide.

9. The camera specified in claim 8 wherein said mask guide is circular.

10. The camera specified in claim 1 wherein said markings comprise a plurality of centering guides and a center dot.

11. The camera specified in claim 1 wherein said markings comprise a lined grid pattern for forming a plurality of exposable areas, the peripheral lines of said grid pattern delineating the viewable area of the film after it has been mounted in a slide.

12. The camera specified in claim 11 wherein said markings further comprise a live area television guide, a film strip live area guide, a television word message guide and at least one mask guide.

13. The camera specified in claim 1 wherein said means comprises a transparent sheet, said sheet having said markings placed thereon.

* * * * *